UNITED STATES PATENT OFFICE.

ADOLF CLAUS, OF FREIBURG, GERMANY, ASSIGNOR TO THE FARBWERKE, VORMALS MEISTER, LUCIUS & BRÜNING, OF HÖCHST-ON-THE-MAIN, GERMANY.

METAIODINORTHOÖXYQUINOLINANA-SULFONIC ACID.

SPECIFICATION forming part of Letters Patent No. 576,494, dated February 2, 1897.

Application filed May 10, 1894. Serial No. 510,687. (Specimens.) Patented in Germany August 25, 1892, No. 72,942.

*To all whom it may concern:*

Be it known that I, ADOLF CLAUS, a citizen of the Empire of Germany, residing at Freiburg, in the Empire of Germany, have invented certain new and useful Improvements in the Production of the Metaiodinorthoöxyquinolinana-Sulfonic Acid by Iodizing the Orthoöxyquinolinana-Sulfonic Acid, (for which Letters Patent were granted to me in Germany, No. 72,942, dated August 25, 1892,) of which the following is a specification.

When the well-known orthoöxyquinolin of the melting-point 76° centigrade is treated with sulfuric acid at elevated temperature or with fuming sulfuric acid at ordinary temperature, there results a monosulfonic acid, which, according to the investigations of Claus-Posselt(*Journal für Practische Chemie,* XLI, p. 33) and of Claus & Hermann, (*Journal für Practische Chemie,* XLII, p. 344,) contains the sulfo group in the so-called "ana" position of the quinolin. This oxyquinolinanasulfonic acid excels by the great ease with which it combines with the halogen atoms in the so-called "meta" position of the quinolin nucleus in substitution of hydrogen. The incorporation of an iodin atom can be produced, therefore, not only by means of iodic acid, &c., but the iodizing can also be carried out with iodin alone in alkali-carbonate solution, better still with iodin carbonate of potassium and subsequent introduction of chlorin, or, which is the most favorable way, by the action of iodid of potassium, chlorid of lime, and hydrochloric acid. In every case the monoiodinorthoöxyanasulfoquinolin is formed. The new compound is but very sparingly soluble in water. On continued boiling with water it undergoes gradual decomposition while developing iodin smell. The air-dry compound is anhydrous. At about 285° centigrade it melts, and at the same time decomposes under separation of iodin.

For purifying the iodinorthoöxyanaquinolin sulfonic acid is dissolved in diluted alkalies or carbonates of alkali and the filtered solution mixed with diluted hydrochloric acid. In this operation, and if the solution is sufficient, the iodinoxyquinolin-sulfonic acid does not separate at once, but it crystallizes after several hours standing almost entirely. The crystallization can be accelerated by agitation. The iodinoxysulfoquinolin forms with metal two series of salts: neutral ones in which the hydrogen of the sulfo group alone is substituted by metal, and others in which also the hydrogen of the phenolhydroxyl is substituted by metals. Among these metallic salts only those of the alkaline metals are soluble in water. The neutral alkaline salts crystallize in the form of beautiful dark-red needles which dissolve very easily in water. On continued boiling of their aqueous solutions they undergo decomposition under separation of iodin. When these salts or their solutions are introduced into free alkali, or also into alkali carbonate, the red color disappears and from the solution crystallize the basic alkaline salts in the form of large yellow hard prismatic crystals. The salts of the alkaline-earth metals and of the heavy metals are insoluble in water, and the best way for obtaining the same is by double decomposition.

*Example of the production of the iodoöxysulfoquinolin.*—Forty grams of orthoöxyquinolinana-sulfonic acid and twelve grams of pure potassium carbonate are heated in a spacious boiling vessel together with from three hundred and fifty to four hundred grams of water. Under separation of carbonic acid a dark-yellow solution is formed, to which at boiling temperature are added 27.5 grams of potassium iodid in concentrated aqueous solution, and afterward 46.8 grams of chlorid of lime containing twenty-five per cent. of effective chlorin. A yellow paste forms, and in the same is carried out the iodizing proper by adding, while keeping it at low temperature and continuously agitating, first one hundred cubic centimeters of diluted hydrochloric acid, (specific gravity 1.025,) and afterward forty-five cubic centimeters of fuming hydrochloric acid. Each drop of the diluted hydrochloric acid produces at the spot where it touches the paste a brown stain of liberated iodin, and now all depends upon causing the completest possible absorption of this free iodin by intermixing it quickly and completely with the mass.

No doubt the reaction mass, in the form as described, is essentially adapted to the iodizing reaction, and consequently as the decomposition proceeds the addition of the hydrochloric acid can be accelerated, so that finally the concentrated hydrochloric acid may be added in quantities of several cubic centimeters at a time, provided that the refrigeration and agitation be well kept up. The quantities of hydrochloric acid prescribed are calculated just so that the potassium and calcium of the entire reaction mass be saturated by it, with the exception of that quantity of calcium corresponding to the quantity of sulfonic acid submitted to the reaction. If, therefore, the reaction has proceeded in manner as it should do, there will be obtained after completion of the addition of acid a homogeneous paste of pretty pure red color, the solid mass of which consists of nothing else than the neutral calcium salt of the iodooxysulfoquinolin. It will be found best to let this product rest for some time, (during a night.) Then it is brought upon a filter and washed with cold water. The precipitation of the calcium salt in still wet state is brought about by mixing it with cold water until it forms a liquid paste, and then causing it to decompose by adding hydrochloric acid with thorough agitation. The product remaining is the red iodoöxyquinolin sulfonic acid in form of a ponderous yellow powder and of very near quantitative yield. The novel iodin derivative of the oxysulfoquinolin combines in manner quite remarkable the characteristic qualities and action of an iodin preparation with those of a quinolin or orthooxyquinolin derivative. It is principally destined for use as a medicament to be applied for external use. It is applied to the parts to be treated in the same manner as iodoform, in quantities corresponding to the size and extension of the wound or other part to be treated.

Having thus described my invention, what I claim as new, and desire to secure by Letters Patent, is—

1. The process herein described of producing metaiodinorthoöxyquinolinana-sulfonic acid, which consists in subjecting an alkaline solution of orthoöxyquinolinana-sulfonic acid to the action of iodin, substantially as set forth.

2. The process herein described of producing metaiodinorthoöxyquinolinana-sulfonic acid, which consists in subjecting an alkaline solution of orthoöxyquinolinana-sulfonic acid to the action of an iodin, and then to the action of hydrochloric acid, substantially as set forth.

3. As a new article of manufacture, metaiodinorthoöxyquinolinana-sulfonic acid having the characteristics of being sparingly soluble in water, undergoing by continued boiling with water gradual decomposition while developing an iodin smell melting at about 285° centigrade and decomposing simultaneously under separation of iodin, substantially as described.

In testimony that I claim the foregoing as my invention I have signed my name in presence of two subscribing witnesses.

AD. CLAUS.

Witnesses:
E. O. ROESSLE,
WILH. STEIGMEYER.